United States Patent
Nam et al.

(10) Patent No.: US 10,727,995 B2
(45) Date of Patent: Jul. 28, 2020

(54) CONFIGURING REFERENCE SIGNAL TRANSMISSION IN WIRELESS COMMUNICATIONS

(71) Applicant: QUALCOMM Incorporated, San Diego, CA (US)

(72) Inventors: Wooseok Nam, San Diego, CA (US); Tao Luo, San Diego, CA (US); Makesh Pravin John Wilson, San Diego, CA (US); Sony Akkarakaran, Poway, CA (US); Kaushik Chakraborty, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 15/981,572

(22) Filed: May 16, 2018

(65) Prior Publication Data

US 2018/0337756 A1    Nov. 22, 2018

Related U.S. Application Data

(60) Provisional application No. 62/508,125, filed on May 18, 2017.

(51) Int. Cl.
| | |
|---|---|
| *H04L 5/00* | (2006.01) |
| *H04L 5/14* | (2006.01) |
| *H04W 72/04* | (2009.01) |
| *H04W 72/08* | (2009.01) |
| *H04W 24/10* | (2009.01) |

(52) U.S. Cl.
CPC .......... *H04L 5/0048* (2013.01); *H04L 5/0051* (2013.01); *H04L 5/14* (2013.01); *H04W 24/10* (2013.01); *H04W 72/0406* (2013.01); *H04W 72/082* (2013.01)

(58) Field of Classification Search
CPC .................................................. H04L 5/0048
See application file for complete search history.

(56) References Cited

U.S. PATENT DOCUMENTS

| | | | |
|---|---|---|---|
| 2009/0129259 A1* | 5/2009 | Malladi ............... | H04B 7/0417 370/210 |
| 2012/0082124 A1* | 4/2012 | Kwon .................. | H04L 5/0007 370/329 |
| 2013/0114533 A1* | 5/2013 | Ji ....................... | H04W 72/1263 370/329 |
| 2014/0334457 A1* | 11/2014 | Tiirola ................. | H04L 5/0096 370/336 |

(Continued)

OTHER PUBLICATIONS

ZTE "Discussion on Measurement and RS Design for CLI Mitigation" submitted as prior art by the applicant (Year: 2017).*

(Continued)

*Primary Examiner* — Jamaal Henson
(74) *Attorney, Agent, or Firm* — Arent Fox LLP

(57) ABSTRACT

Aspects herein describe transmitting reference signals in wireless communications. An indication of resources over which to transmit an uplink reference signal can be received from an access point, where the resources are at least partially used by another device to transmit a downlink reference signal or a second uplink reference signal. The uplink reference signal can be transmitted over the resources.

14 Claims, 9 Drawing Sheets

(56) References Cited

U.S. PATENT DOCUMENTS

| | | | | |
|---|---|---|---|---|
| 2015/0009845 | A1* | 1/2015 | Takano | H04W 52/0206 370/252 |
| 2015/0055583 | A1* | 2/2015 | Lunttila | H04L 5/005 370/329 |
| 2015/0296533 | A1* | 10/2015 | Park | H04B 7/208 370/329 |
| 2015/0341096 | A1* | 11/2015 | Gao | H04B 7/0634 370/278 |
| 2015/0365215 | A1* | 12/2015 | Kim | H04B 7/0413 370/329 |
| 2016/0242188 | A1* | 8/2016 | Tiirola | H04W 72/1231 |
| 2019/0098638 | A1* | 3/2019 | Kakishima | H04J 13/16 |

OTHER PUBLICATIONS

LG Electronics, "Discussion on CLI Measurement for Duplexing Flexibility", submitted as prior art by the applicant (Year: 2017).*

Huawei, UE-to-UE Measurement for Cross Link Interference Mitigation, Document No. R1-1706911, dated May 2017, submitted as prior art by the applicant (Year: 2017).*

Huawei, et al., "UE-to-UE Measurement for Cross-link Interference Mitigation," 3GPP Draft; R1-1706911, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051272141, 7 Pages, Retrieved from the Internet: URL: http://www.3gpp.org/ftp/Meetings_3GPP_SYNC/RAN1/Docs/ [retrieved on May 14, 2017].

International Search Report and Written Opinion—PCT/US2018/033186—ISA/EPO—dated Aug. 14, 2018.

LG Electronics: "Discussion on CLI Measurement for Duplexing Flexibility," 3GPP Draft; R1-1707678 Discussion on CLI Measurement for Duplexing Flexibility, 3rd Generation Partnership Project (3GPP), Mobile Competence Centre; 650, Route Des Lucioles; F-06921 Sophia-Antipolis, vol. RAN WG1, No. Hangzhou; May 15, 2017-May 19, 2017, May 14, 2017, XP051272885, 6 pages, Retrieved from the Internet: URL: http://www.3gpp.org/ftp/Meetings_3GPP_SYNC/RAN1/Docs/ [retrieved on May 14, 2017].

ZTE, et al., "Discussion on Measurements and RS Design for CLI Mitigation," 3GPP Draft; R1-1701615—8.1.6.2, Discussion on Measurement and RS Design for CCI, 3rd Generation Partnership Project (3GPP), Mobile Competence Centre; 650, Route Des Lucioles; F-06921 Sophia-Antipolis, vol. RAN WG1, No. Athens, Greece; Feb. 13, 2017-Feb. 17, 2017, Feb. 6, 2017, XP051220505, 13 pages, Retrieved from the Internet: URL: http://www.3gpp.org/ftp/tsg_ran/WG1_RL1/TSGR1_88/Docs/ [retrieved on Feb. 6, 2017].

* cited by examiner

CONFIGURING REFERENCE SIGNAL TRANSMISSION IN WIRELESS COMMUNICATIONS

CLAIM OF PRIORITY UNDER 35 U.S.C. § 119

The present application for patent claims priority to Provisional Application No. 62/508,125, entitled "CONFIGURING REFERENCE SIGNAL TRANSMISSION IN WIRELESS COMMUNICATIONS" filed May 18, 2017, which is assigned to the assignee hereof and hereby expressly incorporated by reference herein for all purposes.

BACKGROUND

Aspects of the present disclosure relate generally to wireless communication systems, and more particularly, to configuring resources for transmitting reference signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include services such as: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In 5G, the availability of unpaired spectrum in high frequency band has led to selection of time division duplexing (TDD) as a prominent deployment scenario for resource utilization. Dynamic TDD, which is similar to enhanced interference mitigation and traffic adaptation (eIMTA) in LTE, can provide additional flexibility for configuring resources, but may be limited due to cross-link interference (CLI) where a device served by one base station may transmit uplink communications that interfere with downlink communications from another base station (to another device) and/or where a base station may transmit downlink communications (to a device) that interfere with uplink communications from another device to another base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for transmitting reference signals in wireless communications is provided. The method includes receiving, from an access point, an indication of resources over which to transmit an uplink reference signal, where the resources are at least partially used by another device to transmit a downlink reference signal or a second uplink reference signal, and transmitting the uplink reference signal over the resources.

In another example, an apparatus for wireless communication is provided. The apparatus includes a transceiver for communicating one or more wireless signals via at least a transmitter and one or more antennas, a memory configured to store instructions, and one or more processors communicatively coupled with the transceiver and the memory. The one or more processors are configured to receive, from an access point, an indication of resources over which to transmit an uplink reference signal, where the resources are at least partially used by another device to transmit a downlink reference signal or a second uplink reference signal, and transmit the uplink reference signal over the resources.

In another example, a method for configuring reference signal transmission in wireless communications is provided. The method includes receiving, from an access point, an indication of resources over which a downlink reference signal is transmitted, or downlink interference measurement resource (IMR) is configured, by the access point, and configuring a user equipment (UE) to transmit an uplink reference signal over the resources.

In another example, an apparatus for wireless communication is provided. The apparatus includes a transceiver for communicating one or more wireless signals via at least a transmitter and one or more antennas, a memory configured to store instructions, and one or more processors communicatively coupled with the transceiver and the memory. The one or more processors are configured to receive, from an access point, an indication of resources over which a downlink reference signal is transmitted, or downlink IMR is configured, by the access point; and configure a UE to transmit an uplink reference signal over the resources.

In another aspect, a method for canceling interference based on receiving reference signals in wireless communications is provided. The method includes receiving a downlink reference signal from an access point and an uplink reference signal from a user equipment (UE) over a set of resources, measuring first interference caused by the downlink reference signal and second interference caused by the uplink reference signal, and transmitting, to a serving access point, an interference measurement report indicating the first interference and the second interference over the set of resources.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
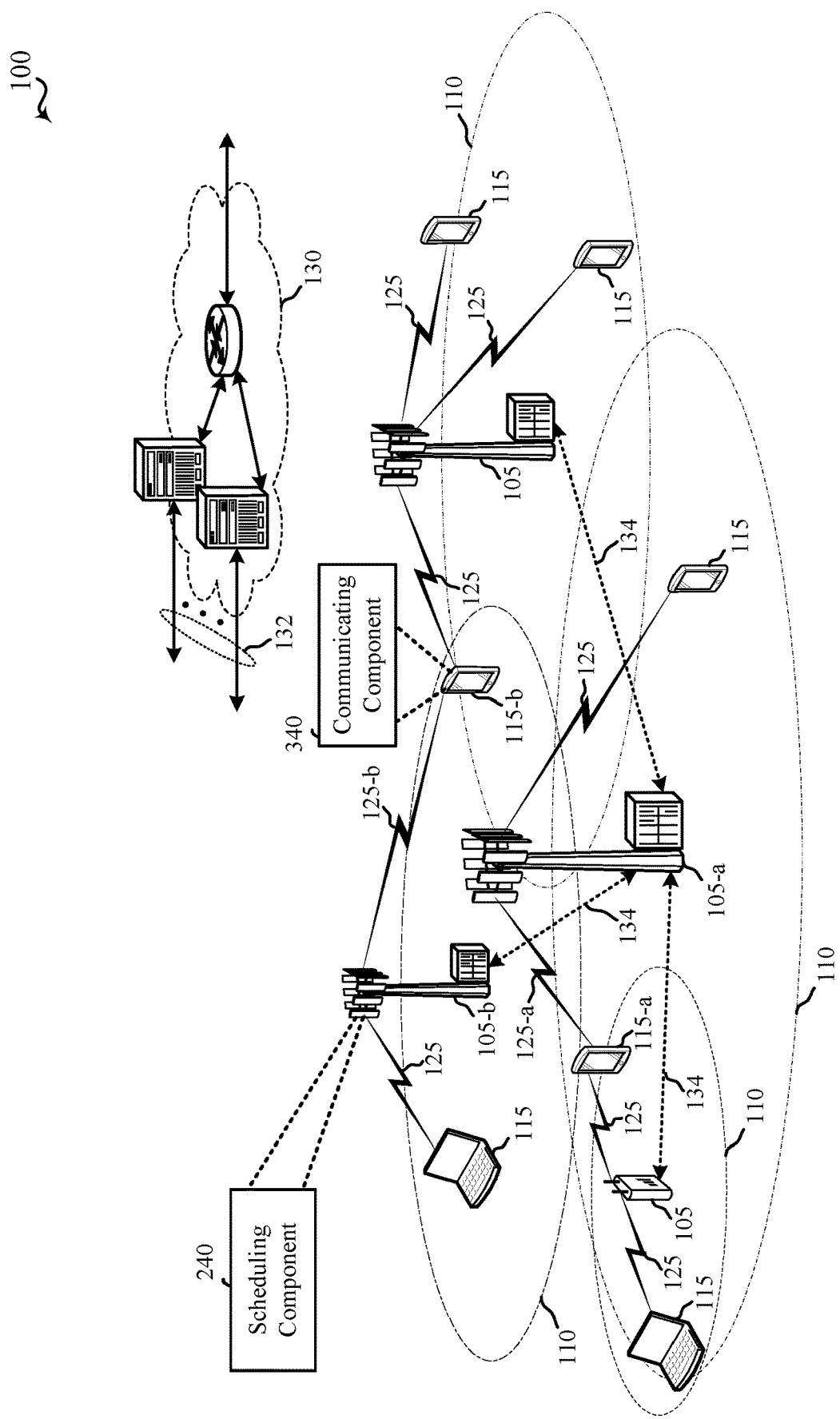
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to scheduling transmission of uplink and downlink reference signals over similar resources (e.g., in frequency, time, and/or space) to facilitate cross-link interference (CLI) measurement and mitigation. For example, an access point can configure resources over which a user equipment (UE) is to transmit an uplink reference signal, where the resources can be at least partially used by another access point to transmit a downlink reference signal or configured as downlink interference measurement resources (IMR) (and/or configured for another UE to transmit another uplink reference signal). For example, in a time division duplexing (TDD) configuration where access points can configure time divisions (e.g., symbols within a slot) for either uplink or downlink communications, the access point may configure the UE to transmit the uplink reference signal in the same symbol of the slot (or other time division) that is used by a base station to transmit the downlink reference signal or configured as downlink IMR (and/or configured for another UE to transmit another uplink reference signal). In an example, the access point can receive an indication of the resources used by another base station to transmit the downlink reference signal, and can accordingly configure the UE to transmit the uplink reference signal over the same resource (e.g., at least the same time resources). The access point may configure the UE to transmit the uplink reference signal orthogonally (e.g., in frequency and/or space) to the downlink reference signal within the symbol.

A served UE that receives the downlink reference signal and the uplink reference signal (e.g., based on CLI), for example, can report, to the serving access point, measurements related to the reference signals. In this example, the access point can accordingly perform interference-aware coordinated scheduling of resources for the served UE. The served UE may be unaware that the uplink reference signal is indeed an uplink signal from another UE, and may report the uplink reference signal as a downlink reference signal (e.g., using a procedure defined for reporting downlink reference signal measurements), which may include reporting the uplink reference signal as corresponding to a different antenna port of a base station. In another example, the UE may combine the uplink reference signal measurement with the downlink reference signal (e.g., when the reference signals are transmitted in the same symbol). In any case, the access point can categorize an interference measurement report received from the served UE into downlink and/or CLI uplink, and can accordingly use the reported interference in scheduling the served UE. In another example, the served UE may be capable of separating the uplink reference signal from the downlink reference signal over the resources, and may accordingly separately report interference measurements for these signals to the serving access point.

In an example, using a mechanism such as that described above may be beneficial in wireless networks that have more availability of unpaired spectrum in high frequency band where time division duplexing (TDD) can be of increased importance (e.g., such as fifth generation (5G) new radio (NR). In such networks, dynamic TDD with CLI mitigation may provide a performance gain over static TDD or dynamic TDD without CLI mitigation. Fast and accurate CLI measurements can enable CLI mitigation in dynamic TDD as well. In this regard, downlink and uplink reference signals and/or measurement procedures can be jointly designed for efficient CLI measurement and reporting, as described above and further herein.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by the UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access by the UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between the base stations 105 and UEs 115. Additionally or alternatively, the base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, base station 105-a and UE 115-a may communicate using communication link 125-a, which may be configured with TDD resources. In addition, for example, base station 105-b and UE 115-b may communicate using communication link 125-b, which may also be configured with TDD resources, though the resource configuration for communication link 125-a and 125-b may be different in a given time division (e.g., in a given symbol of a slot). In an example, however, the resources for communication link 125-a and 125-b may generally be symbol-aligned and/or slot-aligned in time, but a given symbol (or other time division) for communication link 125-a may be configured for uplink communications while the same symbol (or other time division) for communication link 125-b may be configured for downlink communications. Accordingly, in this example, UE 115-b transmitting in resources over communication link 125-b may interfere with downlink transmissions from base station 105-a over communication link 125-a in the symbol or other time division (e.g., as received by UE 115-a). In addition, for example, base station 105-a transmitting in resources over communication link 125-a may interfere with uplink transmission from the UE 115-b over communication link 125-b in the symbol or other time division (e.g., as received by base station 105-b). These two interference scenarios can be referred to as CLI.

In an attempt to address CLI, a base station 105 may include a scheduling component 240 for scheduling resources to one or more UEs for transmitting an uplink reference signal, determining reported interference (e.g., from a different UE) based at least in part on uplink reference signals, determining interference from downlink reference signals transmitted by other base stations, and/or the like. In another example, a UE 115 can include a communicating component 340 configured to transmit an uplink reference signal over resources configured by the access point, report channel state information (CSI) based on a downlink reference signal, report interference from an uplink reference signal, and/or the like.

Turning now to FIGS. 2-9, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
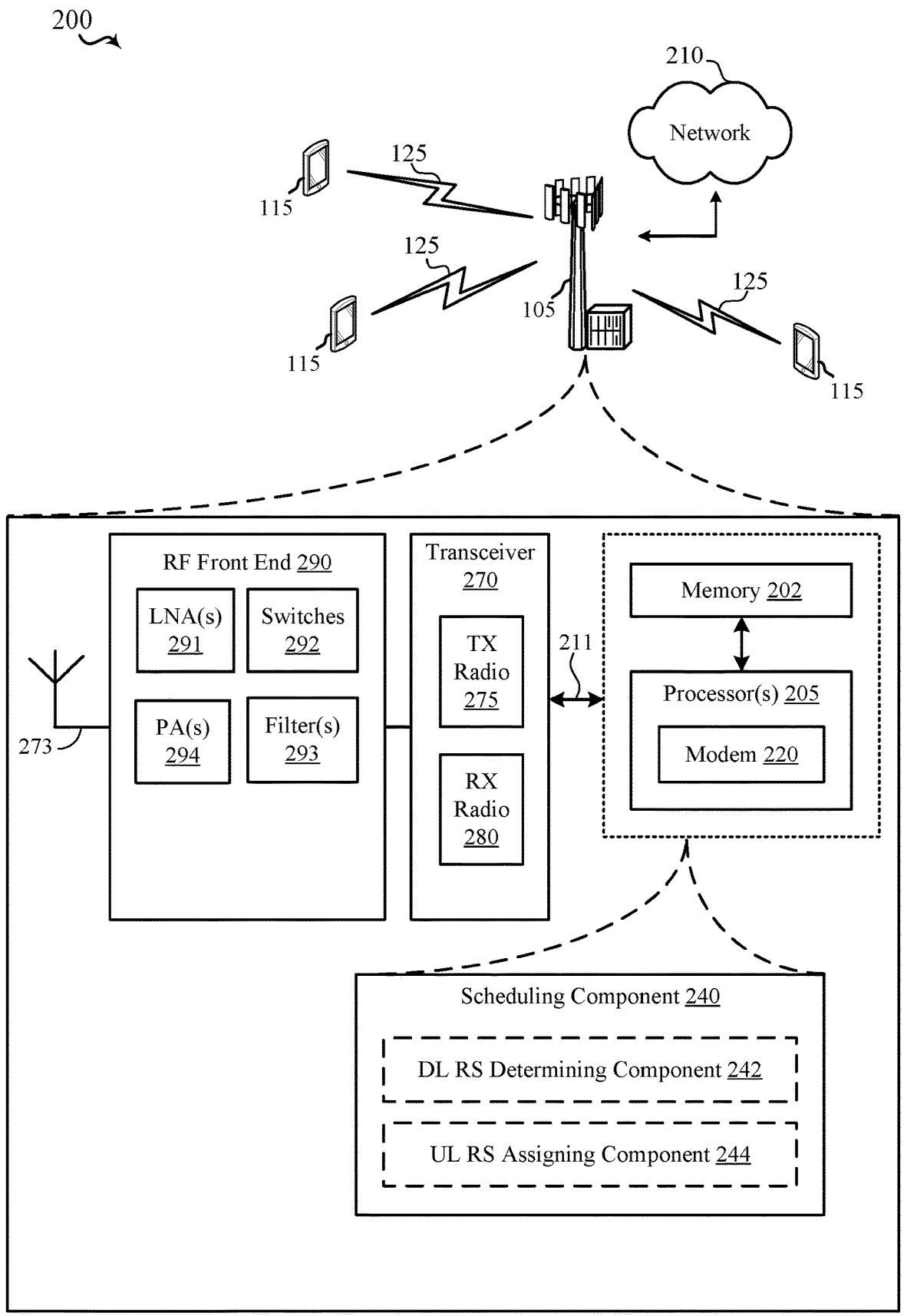
FIG. 2 is a block diagram illustrating an example of a base station, in accordance with various aspects of the present disclosure.

Referring to FIG. 2, a block diagram 200 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to receive RS configurations and/or resources over which to communicate with a base station. Moreover the base station 105 may be an example of the base stations described in the present disclosure (e.g., eNB, gNB, etc.) that are configured to transmit RS configurations and/or schedule UEs for communicating with the base station.

In an aspect, the base station in FIG. 2 may include one or more processors 205 and/or memory 202 that may operate in combination with a scheduling component 240 to perform the functions, methodologies (e.g., method 400 of FIG. 4, method 500 of FIG. 5), or other methods presented in the present disclosure, which may include scheduling communication resources for one or more UEs 115. In accordance with the present disclosure, the scheduling component 240 may include a downlink (DL) reference signal (RS) determining component 242 for determining resources over which a DL RS is transmitted, and/or an uplink (UL) RS assigning component 244 for assigning resources over which a UE is to transmit a UL RS.

The one or more processors 205 may include a modem 220 that uses one or more modem processors. The various functions related to the scheduling component 240, and/or sub-components thereof, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the scheduling component 240 to the UEs 115. The RF front end 290 may be communicatively coupled with one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270. The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 9. Similarly, the memory 202 may correspond to the memory described in connection with the base station in FIG. 9.

Figure 3:
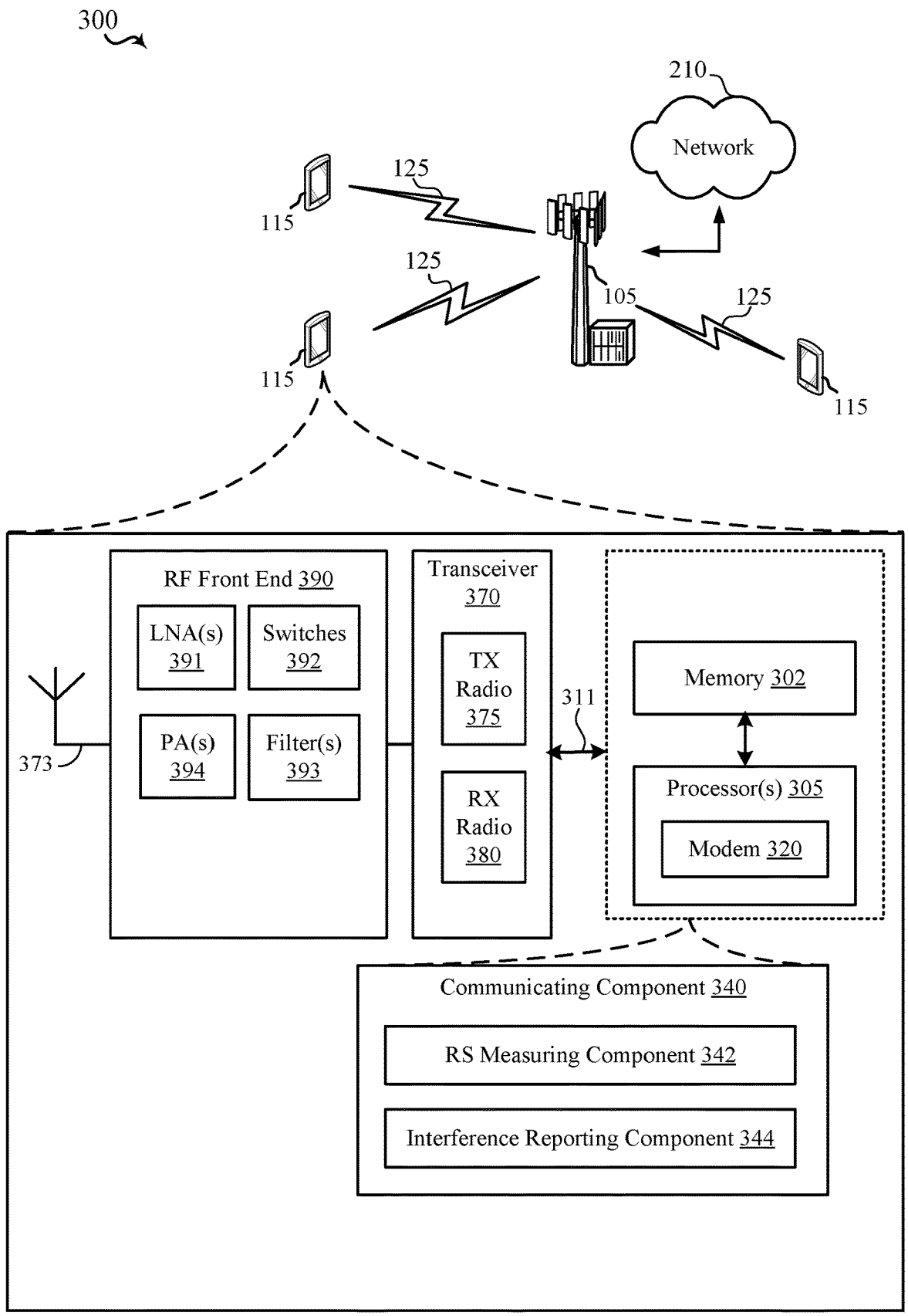
FIG. 3 is a block diagram illustrating an example of a UE, in accordance with various aspects of the present disclosure.

Referring to FIG. 3, a block diagram 300 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to receive RS configurations and/or resources over which to communicate with a base station. Moreover the base station 105 may be an example of the base stations described in the present disclosure (e.g., eNB, gNB, etc.) that are configured to transmit RS configurations and/or schedule UEs for communicating with the base station.

In an aspect, the UE 115 in FIG. 3 may include one or more processors 305 and/or memory 302 that may operate in combination with a communicating component 340 to perform the functions, methodologies (e.g., method 600 of FIG. 6, method 700 of FIG. 7), or other methods presented in the present disclosure. In accordance with the present disclosure, the communicating component 340 may include a RS measuring component 342 for measuring at least a DL RS transmitted by an access point and/or interference from one or more UL RSs transmitted over at least a portion of the same resources as the DL RS, and/or an interference reporting component 344 for reporting the measured DL RS and/or associated interference from UL RS.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. The RF front end 390 may be communicatively coupled with one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 9. Similarly, the memory 302 may correspond to the memory described in connection with the UE in FIG. 9.

In examples described herein, the downlink and uplink reference signals can be jointly designed for efficient CLI measurement and reporting (e.g. to provide fast and accurate CLI measurement to facilitate CLI mitigation in a dynamic time division duplexing (TDD) configuration). In an example, cells of base stations 105 may be aligned in time, such as symbol-aligned and/or slot aligned, where a symbol can be an orthogonal frequency division multiplexing (OFDM) symbol, single carrier frequency division multiplexing (SC-FDM) symbol, or other division of time, and a slot may include a number of symbols (e.g., 7 or 14 symbols per slot in 5G). The DL and UL RSs can be a new type of RS used for CLI measurement or an existing RS (e.g., CSI-RS, sounding RS (SRS), etc.). In an example, a base station 105 can measure base station-to-base station interference based on DL RSs from other base stations, and/or UE 115 can measure UE-to-UE interference based on UL RSs from other UEs, which the UE 115 can report to its serving base station 105. Based on the reported interference measurement, for example, the base station can perform interference-aware coordinated scheduling for a served UE 115. In an example, this can be in conjunction with other interference management/mitigation schemes (e.g., beam coordination, power control, etc.).

Figure 4:
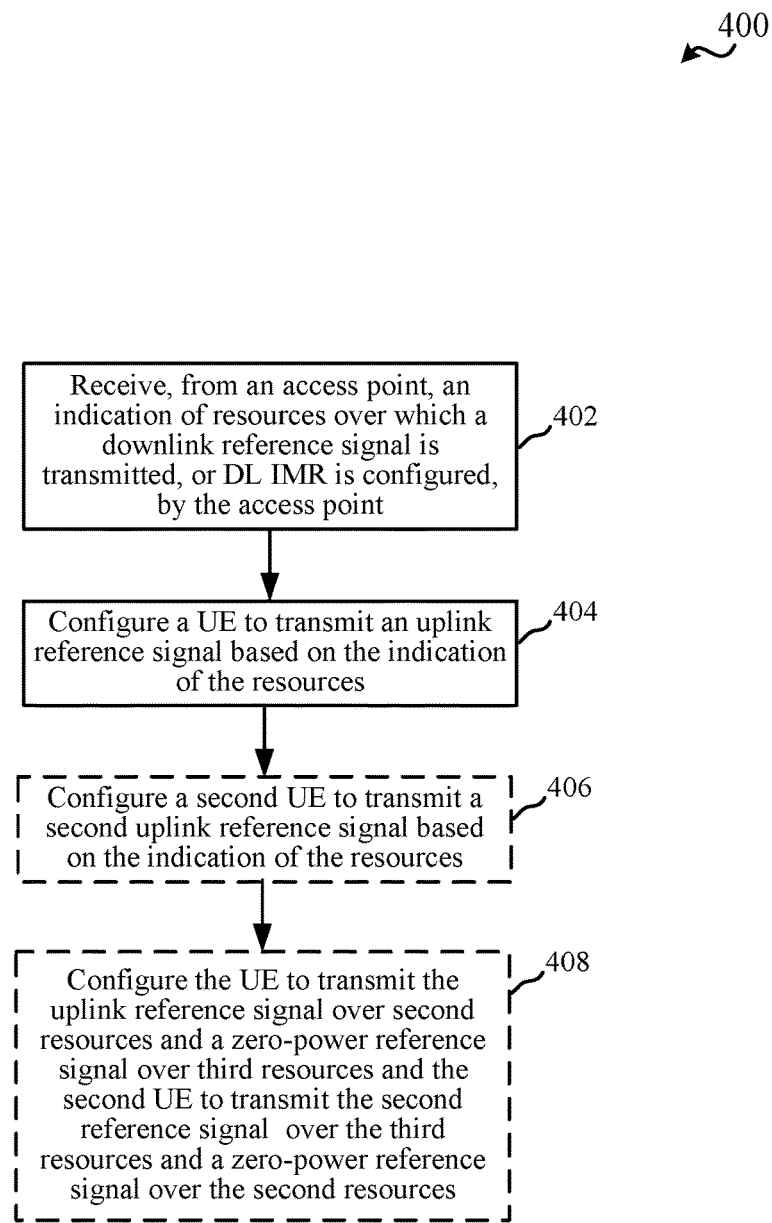
FIG. 4 is a flow chart illustrating an example of a method for configuring transmission of reference signals, in accordance with various aspects of the present disclosure.

FIG. 4 illustrates a flow chart of an example of a method 400 for configuring (e.g., by an access point or base station (e.g., base station 105-b), such as an eNB, gNB, etc.) one or more UEs to transmit a reference signal in resources over which another access point transmits a reference signal. In method 400, blocks indicated as dashed boxes may represent optional steps.

In method 400, at Block 402, an indication of resources over which a DL reference signal is transmitted, or DL interference measurement resources (IMR) is configured, by an access point, can be received from the access point. In an aspect, DL RS determining component 242, e.g., in conjunction with processor(s) 205, memory 202, transceiver 270 and/or scheduling component 240, can receive, from the access point (e.g., another base station 105-a where base station 105-b performs method 400), the indication of resources over which the DL reference signal is transmitted, or the DL IMR is configured, by the access point. For example, base station 105-b may transmit a DL reference signal over certain resources (e.g., in a symbol within a slot), and/or may configure certain resources as DL IMR to allow other base stations to transmit DL reference signal without interference (or at least to mitigate interference) from base station 105. In one example, the resources related to transmitting DL reference signals can be referred to as non-zero-power (NZP) reference signals, and the resource related to DL IMR can be referred to as zero-power (ZP) reference signals, as the base station 105 does not transmit (e.g., uses zero power) over the ZP reference signal resources. In any case, for example, base station 105-a may transmit an indication of the certain resources to base station 105-b and/or other base stations to facilitate CLI mitigation. For example, DL RS determining component 242 may receive the indication from base station 105-b over a backhaul link 132, 134 or other communicative coupling between the base stations 105-a, 105-b. The resources can be indicated as time resources (e.g., symbol(s)), frequency resources (e.g., resource block(s)), spatial resources (e.g., beam(s)), etc. Though CSI-RSs are mainly described herein, in some examples the DL reference signals (whether NZP or ZP) may include SRSs or other reference signals.

In method 400, at Block 404, a UE can be configured to transmit a UL reference signal based on the indication of the resources. In an aspect, UL RS assigning component 244, e.g., in conjunction with processor(s) 205, memory 202, transceiver 270 and/or scheduling component 240, can configure the UE to transmit the UL reference signal based on the indication of the resources. For example, UL RS assigning component 244 may configure the UE 115-b to transmit the UL reference signal based on receiving the indication of the DL reference signal and/or DL IMR from the base station 105-*a*. Moreover, in an example, UL RS assigning component 244 may configure the UE 115-*b* to transmit the UL reference signal based at least in part on another indication that the UE 115-*b* is causing interference to one or more UEs served by base station 105-*a*. In any case, for example, UL RS assigning component 244 can configure the UE 115-*b* by transmitting one or more parameters in a configuration thereto, where the configuration can indicate one or more symbols corresponding to the resources. In another example, UL RS assigning component 244 can determine and/or transmit one or more parameters for orthgonalizing the UL RS with respect to the DL reference signal and/or DL Such parameters may include, for example, a time division (e.g., symbol in a slot) to use in transmitting the RS, frequency division (e.g., one or more resource blocks or resource elements) to use in transmitting the RS, code division (e.g., one or more orthogonal cover codes) to use in transmitting the RS, etc., which can be different that the parameters for the DL CSI-RS/IMR (e.g., as indicated by the base station 105-*a*). Thus, in one example, the UE 115-*b* can transmit UL reference signal using resources orthogonal to those scheduled for DL reference signal and/or DL IMR. Though CSI-RSs are mainly described herein, in some examples the UL reference signals may include SRSs or other reference signals.

For example, UL RS assigning component 244 may assign a symbol of the resources as indicated for DL IMR to allow the UE 115-*b* to transmit UL CSI-RS without interference from other RSs. In another example, UL RS assigning component 244 may assign the same symbol of the resource as indicated for DL CSI-RS transmission by the base station 105-*a*, but can assign or apply a different orthogonal cover code for the UL CSI-RS of UE 115-*a* than that used by base station 105-*b* in transmitting the DL CSI-RS in the same symbol. Also, for example, UL RS assigning component 244 can transmit the one or more parameters in a radio resource control (RRC) layer message, layer 1 (physical or PHY layer) or layer 2 (media access control or MAC layer) message, dedicated control signaling, broadcast signaling (e.g., system information broadcast (SIB), etc.).

Figure 8:
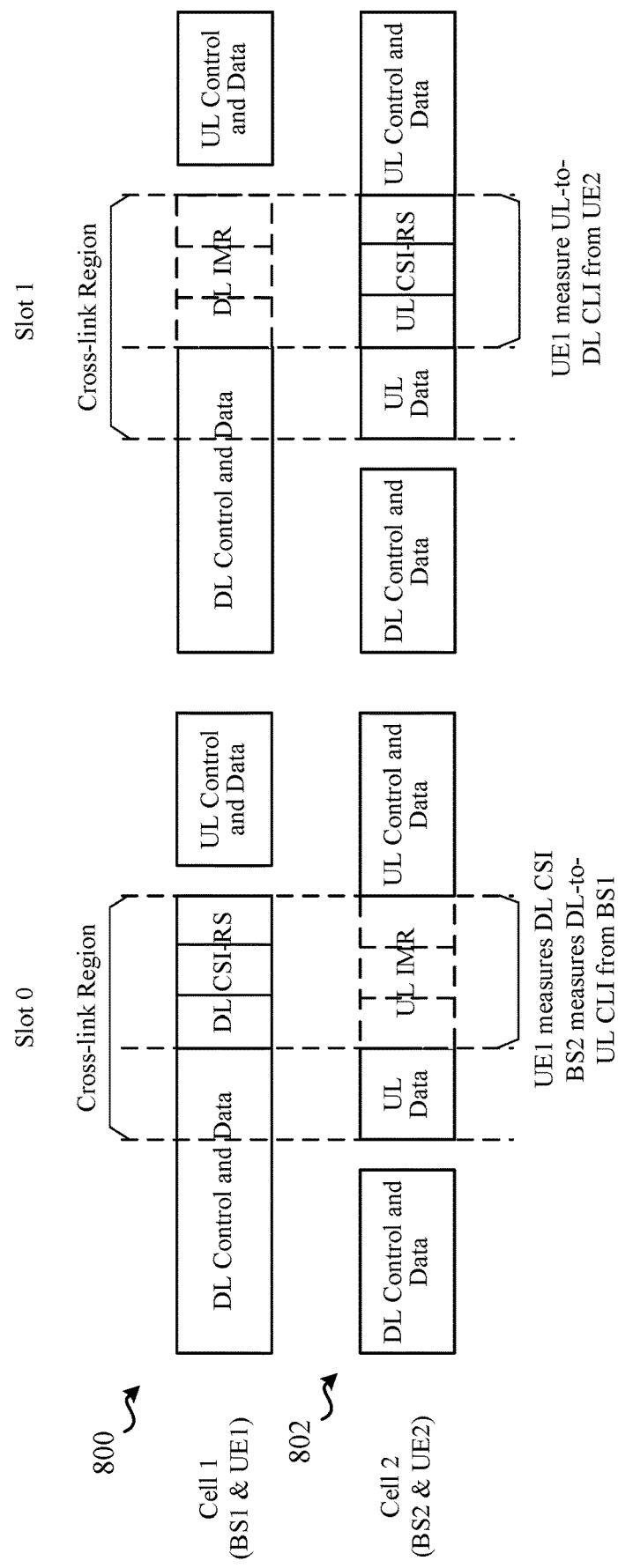
FIG. 8 illustrates examples of resource allocations for reference signals, in accordance with various aspects of the present disclosure.

Moreover, in an example, UL RS assigning component 244 may configure the UE 115-*b* to transmit a SRS over the resources, where the configuration may allow for specifying additional parameters for the SRS, such as a flexible symbol location within the slot (e.g., to place the SRS in the cross-interference region). In any case, for example, the configuration provided to the UE can include an indication of the resources (or at least a portion thereof). The indication may specify time resources (e.g., symbol), frequency resources (e.g., resource block(s)), spatial resources (e.g., beam), etc. In any case, the UE 115 can receive the one or more parameters, and can generate and transmit the UL CSI-RS, SRS, or other RS, based on the one or more parameters, as described further herein Examples of resource allocations and associated RS configurations are illustrated in FIG. 8, at resource allocations 800 and 802. For example, in FIG. 8, resource allocation 800 illustrates a plurality of symbols (e.g., OFDM, SC-FDM, etc. symbols, represented horizontally). Resource allocation 800 corresponds to a first cell (e.g., provided by a first base station, such as base station 105-*a* serving a UE 115-*a*), and resource allocation 802 corresponds to a second cell (e.g., provided by a second base station, such as base station 105-*b* serving UE 115-*b*). In Slot 1, resource allocation 800 includes a plurality of symbols in a downlink control and data region, followed by three symbols for DL IMR, followed by a blank symbol (e.g., to allow switching to uplink in TDD), followed by an uplink control and data region. In Slot 1, resource allocation 802 also includes a plurality of symbols in a shorter downlink control and data region, followed by an uplink control and data region that overlaps (in time) with the downlink region of resource allocation 802. The second cell can allocate the symbols aligning to the DL IMR symbols (e.g., DL ZP CSI-RS symbols) of resource allocation 802 as UL CSI-RS symbols to allow UE 115-*a* to receive and measure UL CSI-RS from UE 115-*b* without interference from downlink communications of base station 105-*a*. For example, UL RS assigning component 244 of base station 105-*b* can assign these resources to UE 115-*b* to facilitate transmitting the UL CSI-RS. In addition, in an example, UL RS assigning component 244 may notify additional neighboring base stations of the assignment of resources to cause the other base stations not to transmit DL CSI-RS over the resources.

In method 400, optionally at Block 406, a second UE can be configured to transmit a second UL reference signal based on the indication of the resources. In an aspect, UL RS assigning component 244, e.g., in conjunction with processor(s) 205, memory 202, transceiver 270 and/or scheduling component 240, can configure the second UE to transmit the second UL reference signal based on the indication of the resources. For example, UL RS assigning component 244 can configure the second UE to transmit the second UL reference signal over the same resources (e.g., the same symbol and/or frequency division) as the UE 115-*a* transmits its UL reference signal) and/or using a different orthogonal cover code. Thus, UE 115-*b* may be able to detect the two (or more) UL reference signals from the two (or more) UEs, and can accordingly report the interference of one or both of the UEs to the base station 105-*b*, as described further herein.

In method 400, optionally at Block 408, the UE can be configured to transmit the uplink reference signal over second resources and a ZP reference signal over third resources, and the second UE can be configured to transmit the second reference signal over the third resources and a ZP reference signal over the second resources. In an aspect, UL RS assigning component 244, e.g., in conjunction with processor(s) 205, memory 202, transceiver 270 and/or scheduling component 240, can configure the UE 115-*a* to transmit the uplink reference signal over second resources and a ZP reference signal over third resources, and the second UE to transmit the second reference signal over the third resources and a ZP reference signal over the second resources. For example, in reference to FIG. 8, given three DL IMR symbols indicated in resource allocation 800, UL RS assigning component 244 can configure (e.g., in resource allocation 802) both UEs to transmit UL reference signal over the first symbol, one UE to transmit UL reference signal over the second symbol (and a ZP reference signal in the third symbol) and the other UE to transmit UL reference signal in the third symbol (and a ZP reference signal in the second symbol). This can allow UE 115-*b* to determine interference caused by both UEs based on the corresponding UL reference signals in a multiple interferer situation. Thus, in this regard, multiple UEs and base stations can be jointly configured to generate different cross-cell/inter-cell interference patterns on different reference signal resources.

Figure 5:
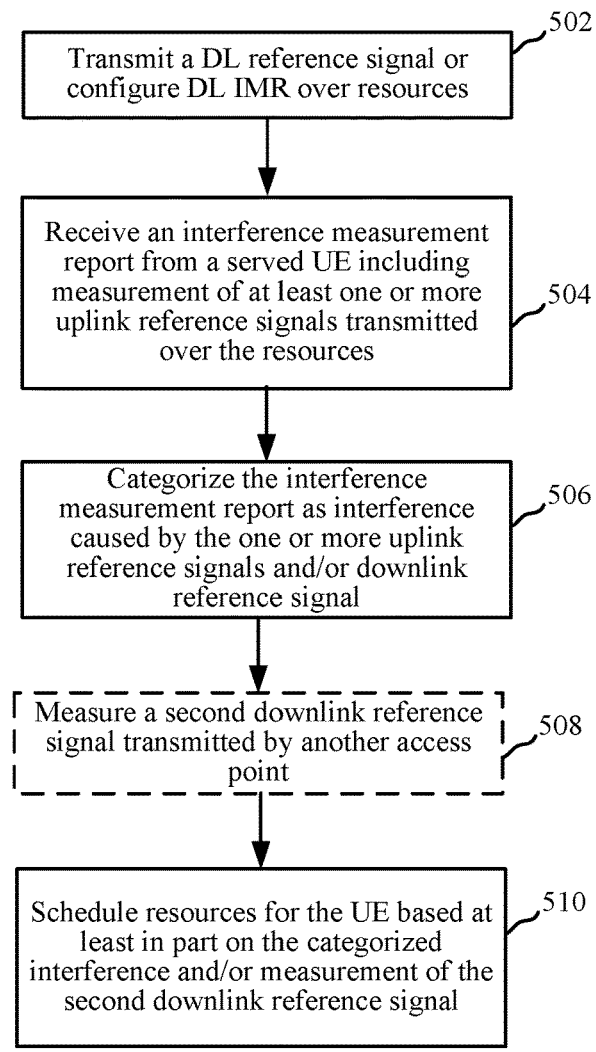
FIG. 5 is a flow chart illustrating an example of a method for receiving reference signal measurements, in accordance with various aspects of the present disclosure.

FIG. 5 illustrates a flow chart of an example of a method 500 for receiving (e.g., by an access point or base station (e.g., base station 105-*a*), such as an eNB, gNB, etc.) measurements associated with one or more reference signals transmitted by a base station or UE. In method 500, blocks indicated as dashed boxes may represent optional steps.

In method 500, at Block 502, a DL reference signal can be transmitted or DL IMR can be configured over resources. In an aspect, scheduling component 240, e.g., in conjunction with processor(s) 205, memory 202, and/or transceiver 270, can transmit the DL reference signal or configure the DL IMR over the resources. For example, the resources may include a frequency division over a time division (e.g., one or more symbols of a slot). In one example, configuring the DL IMR and/or the DL reference signal may include and/or may be based on transmitting an indication of the resources over which the DL reference signal is transmitted and/or which resources are considered DL IMR (e.g., as ZP reference signal that other base stations may use for transmitting DL reference signal). Scheduling component 240 can transmit such configurations using RRC or other higher layer signaling, dedicated control signaling to a UE, etc., and/or may transmit reference signals over a control channel using the frequency division over the time division (e.g., one or more resource blocks of an OFDM or SC-FDM symbol in a slot of multiple symbols). For example, the DL reference signal may include CSI-RS, SRS, or other reference signals, as described. Resource allocation 800 in FIG. 8 shows examples of symbols used for DL CSI-RS and DL IMR.

For example, one or more UEs 115-a may receive the DL CSI-RS and/or the configuration indicating DL IMR (and/or DL CSI-RS resources), and may measure CSI-RSs over the resources. In one example, the UE 115-a may be agnostic to the fact that the CSI-RSs transmitted over the resources may actually include UL CSI-RSs (as opposed to DL CSI-RSs), as described herein, and may thus measure and report any UL CSI-RSs received in DL IMR as DL CSI-RSs. In one example, such UEs may report the UL CSI-RSs as related to a different antenna port of the base station 105-a. Base station 105-a, however, may be able to distinguish reported interference measurements based on information from base station 105-b on resources over which it instructed one or more UEs (e.g., UE 115-b) to transmit UL CSI-RS. For example, the information can be shared among the base stations 105-a, 105-b over a backhaul link, as described.

In method 500, at Block 504, an interference measurement report can be received from a served UE including measurement of at least one or more UL reference signals transmitted over the resources. In an aspect, scheduling component 240, e.g., in conjunction with processor(s) 205, memory 202, and/or transceiver 270, can receive the interference measurement report from the served UE, where the report includes measurement of at least one or more UL reference signals transmitted over the resources. As described, for example, another base station (e.g., base station 105-b) can instruct a UE to transmit UL reference signals on the resources indicated as being used by the base station 105-a for DL reference signal or DL IMR. Thus, the served UE 115-a may measure the UL reference signals received over the resources (though it may not distinguish the reference signals as being UL or DL). In one example, where the UE 115-a is capable of distinguishing UL and DL reference signals, the measurement report may indicate whether the measurement corresponds to an UL or DL reference signal. In other examples, the report may not distinguish between measurements for UL and DL reference signal, and/or the base station 105 may do so based in part on known information regarding scheduled resources.

In any case, in method 500, at Block 506, the interference measurement report can be categorized as interference caused by one or more UL reference signals and/or DL reference signals. In an aspect, scheduling component 240, e.g., in conjunction with processor(s) 205, memory 202, and/or transceiver 270, can categorize the interference measurement report as interference caused by one or more reference signals and/or DL reference signals. For example, scheduling component 240 can determine the categorization based on the measurement report specifying whether measurements are related to UL or DL reference signals. In another example, scheduling component 240 can determine resources used for UL reference signals based on determining resources indicated by another base station (e.g., base station 105-b) as being used for DL reference signal or DL IMR. Where measurements correspond to resources indicated as used for DL reference signal, scheduling component 240 may attempt to separate the UL and DL reference signal measurements based on known orthogonality parameters. For example, scheduling component 240 may receive an indication of resources from the other base station (e.g., base station 105-b) as to a symbol over which UL reference signal is configured for one or more UEs, a portion of frequency resources over which UL reference signal is configured for the one or more UEs, orthogonal cover code(s) used by the one or more UEs in transmitting the UL reference signals, and/or the like, and the scheduling component 240 may accordingly categorize received interference measurements based on associated symbol.

In another example, the UE 115-a may report the interference measurements as related to different antenna ports of the base station (e.g., base station 105-a) based on determining that the reference signals are transmitted in different frequency resources, symbols, using different orthogonal cover codes, etc. In this regard, scheduling component 240 may categorize the measured interference based on an indication of antenna port specified by the UE 115-a.

In method 500, optionally at Block 508, a second DL reference signal transmitted by another access point can be measured. In an aspect, scheduling component 240, e.g., in conjunction with processor(s) 205, memory 202, and/or transceiver 270, can measure the second downlink reference signal transmitted by another access point (e.g., base station 105-b). For example, scheduling component 240 can determine resources associated with the DL reference signal of other base stations, as described above, and may accordingly declare related resources as UL IMR for measuring the DL reference signal of other base stations without UL interference from other UEs. Thus, during the uplink for base station 105-a, CLI from base station 105-b and the uplink channel from UE 115-a can be measured.

In method 500, at Block 510, resources can be scheduled for the UE based at least in part on the categorized interference and/or measurement of the second DL reference signal. In an aspect, scheduling component 240, e.g., in conjunction with processor(s) 205, memory 202, and/or transceiver 270, can schedule resources for the UE (e.g., UE 115-a) based at least in part on the categorized interference and/or measurement of the second DL reference signal. For example, scheduling component 240 can avoid scheduling downlink resources to the UE 115-a that may be interfered by UE 115-b on the uplink and/or uplink resources that may be interfered by base station 105-b on the downlink, etc. Accordingly, CLI can be taken into consideration in scheduling the resources, as the UE 115-a measurements of UL reference signals can be used in scheduling the resources for the UE 115-a.

Figure 6:
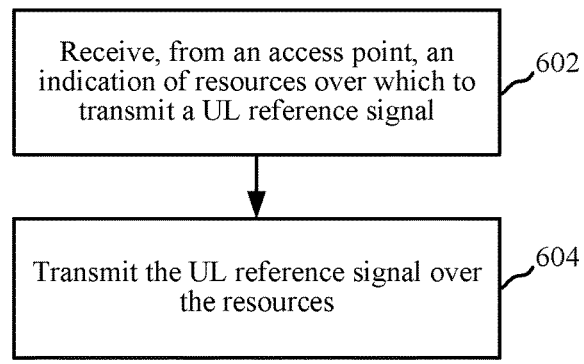
FIG. 6 is a flow chart illustrating an example of a method for transmitting reference signals, in accordance with various aspects of the present disclosure.

FIG. 6 illustrates a flow chart of an example of a method 600 for transmitting (e.g., by UE) a UL reference signal. In method 600, blocks indicated as dashed boxes may represent optional steps.

In method 600, at Block 602, an indication of resources over which to transmit a UL reference signal can be received from an access point. In an aspect, communicating component 340, e.g., in conjunction with processor(s) 305, memory 302, and/or transceiver 370, can receive, from the access point, an indication of resources over which to transmit a UL reference signal. As described, for example, the resources indicated by the access point may include resources used by the access point or another access point for transmitting DL reference signal, configuring DL IMR, etc. Moreover, for example, the resources may be orthogonal to DL reference signal resources in time, frequency, or space, and associated parameters may be received from the access point (e.g., a symbol index, resource block, orthogonal cover code, etc. to use in transmitting the UL reference signal). The resources can be indicated as time resources (e.g., symbol), frequency resources (e.g., resource block(s)), spatial resources (e.g., beam), etc. Additionally, as described, communicating component 340 can receive the resources (e.g., or an indication of the resources or parameters for determining the resources) in layer 1 signaling, layer 2 signaling, higher layer signaling (e.g., RRC), broadcast or dedicated signaling, in a control channel, and/or the like, from the access point. Moreover, as described, the reference signal may include one or more of an UL CSI-RS, UL SRS, or other UL reference signal.

In method 600, at Block 604, the UL reference signal can be transmitted over the resources. In an aspect, communicating component 340, e.g., in conjunction with processor(s) 305, memory 302, and/or transceiver 370, can transmit the UL reference signal over the resources. For example, communicating component 340 may transmit the UL reference signal over the indicated symbol, resource block, etc., using the specified orthogonal cover code, and/or the like to facilitate transmitting UL reference signal for CLI mitigation, as described herein. For example, this may include communicating component 304 transmitting the UL reference signal over similar resources as DL reference signal or DL IMR resources (e.g., in a similar symbol but over different frequency resources or using a different orthogonal cover code, etc.).

Figure 7:
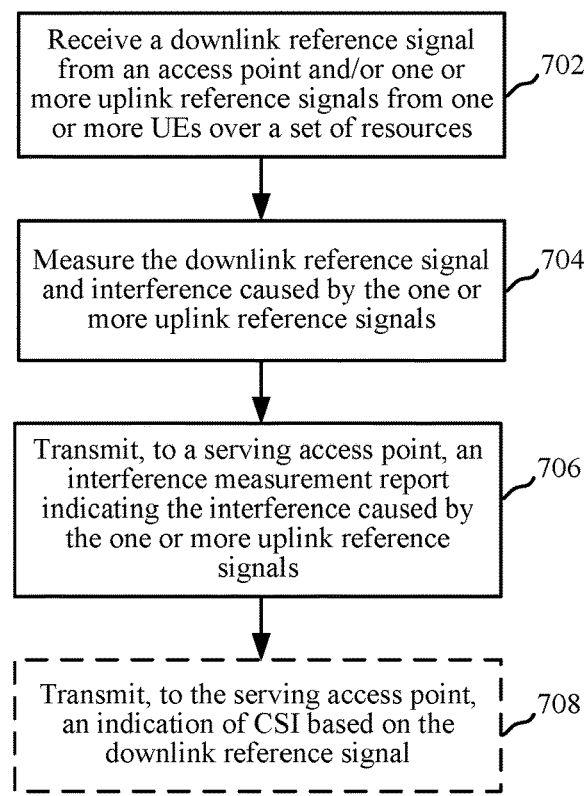
FIG. 7 is a flow chart illustrating an example of a method for transmitting interference measurement reports, in accordance with various aspects of the present disclosure.

FIG. 7 illustrates a flow chart of an example of a method 700 for transmitting (e.g., by UE) an interference measurement report to an access point. In method 700, blocks indicated as dashed boxes may represent optional steps.

In method 700, at Block 702, a DL reference signal can be received from an access point, and/or one or more UL reference signals can be received from one or more UEs over a set of resources. In an aspect, RS measuring component 342, e.g., in conjunction with processor(s) 305, memory 302, communicating component 340, and/or transceiver 370, can receive, over a set of resources, a DL reference signal from an access point and/or one or more UL reference signals from one or more UEs. For example, RS measuring component 342 may receive DL reference signals and UL reference signals orthogonally to one another (e.g., in time, frequency, space, etc.). For instance, RS measuring component 342 may receive DL reference signal in a symbol of a slot and may receive UL reference signal in a symbol of another slot. In another example, RS measuring component 342 may receive DL reference signal and UL reference signal in different frequency divisions, using different orthogonal cover codes, etc., in the same symbol or otherwise. Moreover, as described, RS measuring component 342 may receive (and measure) multiple reference signals received from multiple UEs over the set of resources (e.g., based on different orthogonal cover codes, different utilized frequency resources, etc.). Moreover, as described, the downlink reference signal and/or uplink reference signal may include CSI-RS, SRS, other reference signals.

In method 700, at Block 704, the downlink reference signal and interference caused by the one or more UL reference signals can be measured. In an aspect, RS measuring component 342, e.g., in conjunction with processor(s) 305, memory 302, communicating component 340, and/or transceiver 370, can measure the DL reference signal and interference caused by the one or more UL reference signals. As described, for example, RS measuring component 342 can distinguish between the DL reference signal and UL reference signal in one example (e.g., based on resources over which the reference signals are transmitted, an indication in the reference signals, etc.). In an example, measuring the interference may include measuring one or more properties of the signal received in the set of resources (e.g., a received signal strength indicator (RSSI), reference signal received power (RSRP), reference signal received quality (RSRQ), signal-to-noise ratio (SNR), etc.).

In method 700, at Block 706, an interference measurement report can be transmitted, to a serving access point, indicating the interference caused by the one or more UL reference signals. In an aspect, interference reporting component 344, e.g., in conjunction with processor(s) 305, memory 302, communicating component 340, and/or transceiver 370, can transmit, to the serving access point, an interference measurement report indicating at least the interference caused by the one or more UL reference signals. For example, interference reporting component 344 can report the interference by indicating whether and/or which UL reference signal to which the interference relates. For example, interference reporting component 344 may indicate a symbol, frequency resources, orthogonal cover code, etc. related to the received UL reference signal, and may indicate the interference or associated signal parameter measurement. Interference reporting component 344 may transmit the interference measurement report in dedicated resources to the serving access point, in one example.

In method 700, optionally at Block 708, an indication of CSI based on the DL reference signal can be transmitted to the serving access point. In an aspect, interference reporting component 344, e.g., in conjunction with processor(s) 305, memory 302, communicating component 340, and/or transceiver 370, can transmit, to the serving access point, an indication of CSI based on the DL reference signal. Thus, interference reporting component 344 can not only report the interference from UL reference signal, but can also determine and report CSI related to the received reference signal for use by the serving access point in scheduling resources to the UE. As described, in one example, the UE may not distinguish between UL and DL reference signals, and interference reporting component 344 may report both (e.g., as DL reference signal) to the serving access point.

Figure 9:
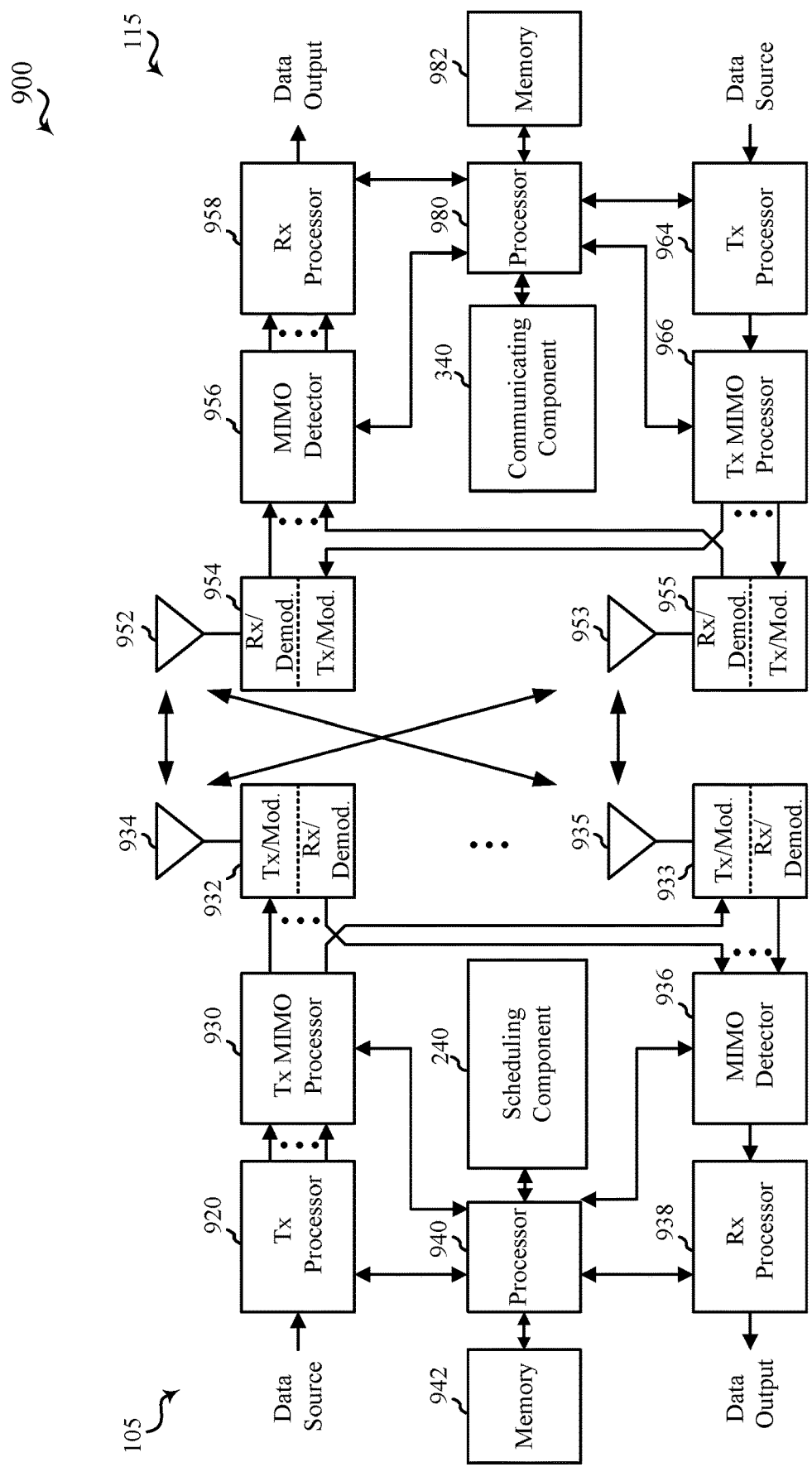
FIG. 9 is a block diagram illustrating an example of a MIMO communication system including a base station and a UE, in accordance with various aspects of the present disclosure.

FIG. 9 is a block diagram of a MIMO communication system 900 including a base station 105 and a UE 115. The MIMO communication system 900 may illustrate aspects of the wireless communication system 100 described with reference to FIG. 1. The base station 105 may be an example of aspects of the base station 105 described with reference to FIGS. 1-3. The base station 105 may be equipped with antennas 934 and 935, and the UE 115 may be equipped with antennas 952 and 953. In the MIMO communication system 900, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 115 may be an example of aspects of the UEs 115 described with reference to FIGS. 1-3. At the UE 115, the UE antennas 952 and 953 may receive the DL signals from the base station 105 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 115 to a data output, and provide decoded control information to a processor 980, or memory 982.

The processor 980 may in some cases execute stored instructions to instantiate a communicating component 340 (see e.g., FIGS. 1 and 3).

On the uplink (UL), at the UE 115, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 105 in accordance with the communication parameters received from the base station 105. At the base station 105, the UL signals from the UE 115 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for transmitting reference signals in wireless communications, comprising:
   receiving, from an access point, an indication of resources over which to transmit an uplink reference signal, wherein the resources are at least partially used by another access point to transmit, in a same symbol, a downlink reference signal; and
   transmitting the uplink reference signal over the resources in the same symbol.

2. The method of claim 1, wherein the resources are configured such that the uplink reference signal is transmitted orthogonally to the downlink reference signal over the resources.

3. The method of claim 1, wherein the resources are at least partially used by a third device, to transmit, in the same symbol, a second uplink reference signal.

4. The method of claim 1, further comprising receiving an orthogonal cover code from the access point, and applying the orthogonal cover code to the uplink reference signal prior to transmitting the uplink reference signal, wherein the orthogonal cover code is different from another orthogonal cover code used for transmitting the downlink reference signal.

5. The method of claim 1, wherein transmitting the uplink reference signal comprises using one or more parameters defined for transmitting a sounding reference signal at a flexible location within a slot.

6. The method of claim 1, further comprising:
   receiving a different downlink reference signal from a different access point and a different uplink reference signal from a user equipment (UE) over frequency resources in a same second symbol;
   measuring first interference caused by the different downlink reference signal and second interference caused by the different uplink reference signal; and
   transmitting, to the access point, an interference measurement report indicating the first interference and the second interference over the frequency resources.

7. The method of claim 6, wherein the second uplink reference signal uses one or more parameters defined for a sounding reference signal.

8. The method of claim 1, wherein the uplink reference signal is an uplink channel state information reference signal (CSI-RS), and wherein the downlink reference signal is a downlink CSI-RS.

9. An apparatus for wireless communication, comprising:
   a transceiver for communicating one or more wireless signals via at least a transmitter and one or more antennas;
   a memory configured to store instructions; and
   one or more processors communicatively coupled with the transceiver and the memory, wherein the one or more processors are configured to:
      receive, from an access point, an indication of resources over which to transmit an uplink reference signal, wherein the resources are at least partially used by another access point to transmit, in a same symbol, a downlink reference signal; and
      transmit the uplink reference signal over the resources in the same symbol.

10. The apparatus of claim 9, wherein the resources are configured such that the uplink reference signal is transmitted orthogonally to the downlink reference signal over the resources.

11. The apparatus of claim 9, wherein the resources are at least partially used by a third device, to transmit, in the same symbol, a second uplink reference signal.

12. The apparatus of claim 9, wherein the one or more processors are further configured to receive an orthogonal cover code from the access point, and apply the orthogonal cover code to the uplink reference signal prior to transmitting the uplink reference signal, wherein the orthogonal cover code is different from another orthogonal cover code used for transmitting the downlink reference signal.

13. The apparatus of claim 9, wherein the one or more processors are configured to transmit the uplink reference signal at least in part by using one or more parameters defined for transmitting a sounding reference signal at a flexible location within a slot.

14. The apparatus of claim 9, wherein the one or more processors are further configured to:
   receive a different downlink reference signal from a different access point and a different uplink reference signal from a user equipment (UE) over frequency resources in a second same symbol;
   measure first interference caused by the different downlink reference signal and second interference caused by the different uplink reference signal; and transmit, to the access point, an interference measurement report indicating the first interference and the second interference over the frequency resources.

\* \* \* \* \*